United States Patent [19]

Leman et al.

[11] Patent Number: 4,630,998

[45] Date of Patent: Dec. 23, 1986

[54] APPARATUS FOR CONTROL OF COLLECTIVE AND CYCLIC PITCH OF THE BLADES OF A ROTOR

[75] Inventors: Jean-Luc Leman; Michel V. Russier, both of Aix-en-Provence; Robert J. Suzzi, Marseilles, all of France

[73] Assignee: Aerospatiale Société Nationale Industrielle, Paris, France

[21] Appl. No.: 732,767

[22] Filed: May 10, 1985

[30] Foreign Application Priority Data

May 14, 1984 [FR] France ................... 84 07421

[51] Int. Cl.⁴ ............... B64C 27/35; B64C 27/605
[52] U.S. Cl. ................... 416/134 A; 416/114
[58] Field of Search ............ 416/134 A, 114, 115

[56] References Cited

U.S. PATENT DOCUMENTS

| | | | |
|---|---|---|---|
| 3,228,673 | 1/1966 | Hinks | 416/134 A X |
| 3,390,899 | 7/1968 | Herbert et al. | 416/134 A X |
| 3,558,082 | 1/1971 | Bennie | 416/114 X |
| 3,679,197 | 7/1972 | Schmidt | 416/134 A X |
| 3,862,812 | 1/1975 | Gorndt et al. | 416/141 |
| 3,933,324 | 1/1976 | Ostrowski | 416/102 X |
| 3,952,546 | 4/1976 | Nakano et al. | 416/134 A X |
| 4,297,078 | 10/1981 | Martin | 416/140 A X |
| 4,323,332 | 4/1982 | Fradenburgh | 416/134 A |
| 4,365,936 | 12/1982 | Hatch | 416/134 A |
| 4,477,225 | 10/1984 | Burkam | 416/148 X |
| 4,588,355 | 5/1986 | Ferris et al. | 416/134 A X |

FOREIGN PATENT DOCUMENTS

| | | | |
|---|---|---|---|
| 888158 | 12/1943 | France | 416/114 |
| 1049106 | 12/1953 | France . | |
| 1054268 | 2/1954 | France | 416/114 |
| 63478 | 9/1955 | France . | |
| 2119828 | 8/1972 | France . | |
| 8003994 | 9/1980 | France . | |
| 363642 | 2/1939 | Italy | 416/102 |

*Primary Examiner*—Everette A. Powell, Jr.
*Attorney, Agent, or Firm*—Armstrong, Nikaido, Marmelstein & Kubovcik

[57] ABSTRACT

Apparatus for controlling both collective and cyclic pitch of blades of a helicopter rotor comprises a non-rotating plate which is connected via a fixed caliper and servo controls to a fixed housing and to which is attached the internal ring of a ball race bearing. The external ring of the bearing carries a rotating plate, which is connected by means of rotating caliper or links to each of the rotors and by means of pitch rods to control levers for adjusting the pitch of the blades. The non-rotating plate is fixed to external armatures of laminated joint pieces which are mounted slidingly up and down a guide base. The collective pitch is controlled by sliding the assembly of non-rotating plate and joint pieces up or down the guide base while the cyclic pitch is controlled by inclining the assembly relative to the main rotor shaft. This inclination involves deformations in the laminated joints.

7 Claims, 3 Drawing Figures

APPARATUS FOR CONTROL OF COLLECTIVE AND CYCLIC PITCH OF THE BLADES OF A ROTOR

FIELD OF THE INVENTION

The present invention relates to apparatus for controlling the pitch of the blades of a rotor and it relates in particular to apparatus with cyclic plates designed to control the collective or overall pitch and the cyclic pitch of the blades of a rotor of a rotorcraft. More particularly the invention relates to apparatus of this type in which the cyclic plates in particular are constructed and arranged with a particular arrangement for articulation and sliding relative to the shaft of a lifting or principal rotor of a helicopter with the object of controlling the collective and the cyclic pitch of the blades of this rotor.

BACKGROUND TO THE INVENTION

It is well known that the variations of the support force exerted by a main rotor of a rotorcraft are obtained by varying simultaneously and in the same sense the incidence of all of the blades of this rotor (overall or collective pitch control) and that the steering of a rotorcraft, the shaft of each support rotor of which is maintained in a fixed position on the structure of the rotor craft, is effected by varying cyclically the pitch of the baldes (cyclic pitch control).

With the object of transmitting control commands for the overall pitch and the cyclic pitch to the blades of a rotor it has already been proposed to use apparatus comprising two annular plates assembled together via at least one ball bearing and mounted concentrically around the shaft of the rotor and of which one is a non-turning plate fixed in terms of rotation by at least one lower link member fixed to at least one housing rigidly connected to the structure of the rotorcraft and mounted on the one hand so that it is displaceable in the direction along the shaft of the rotor and on the other hand oscillating relative to the shaft of the rotor via the action of an articulation mechanism, while the other is a turning plate brought to rotation with the shaft of the rotor by at least one upper link member fixed to the shaft and/or to the hub of the rotor and connected to a control lever for the pitch of each of the blades of the rotor via a pitch rod, the non-turning plate being acted on by control members for the general pitch which control its displacement along the shaft as well as by cyclic pitch control elements, which effect its oscillations relative to the shaft, in such a fashion that the turning plate, which follows the movements of the non-turning plate, transmits these movements to pitch control levers via patch rods.

Thus control of the collective pitch is obtained by axial translation of the assembly of the plates, effected by axial sliding along the shaft of the rotor of the articulation mechanism, and control of the cyclic pitch is obtained by an inclination of the assembly of the plates relative to the axis of the shaft of the rotor thanks to the articulation mechanism.

From French Patent Specification No. 1049106 and its Certificate of Addition Number 63478 a device of the type stated is known in which the rotating plate is in an externally radial position relative to a single ball bearing which joins the two plates and which has the form of a star having as many branches as the rotor as blades and which is brought into rotation via a rotating caliper which forms the upper link element and is pivoted by its upper end on the hub. This star-shaped plate is mounted rotatably on the non-turning plate which is in a radially inner position and is articulated relative to the shaft via a universal joint in such a way as to enable it to be inclined in all directions in space under the action of the two "V" arms which constitute the cyclic pitch control elements. The control elements for the collective pitch and the lower link elements are formed by means of a common mechanism comprising a two armed fork pivotally mounted on the non-turning plate around a diametric axis of the shaft and a box on which there is pivotally mounted about an axis perpendicular to the axis of articulation of the arms of the fork with the object of providing a universal joint, the tail of the fork, this box being connected to a support fixed relative to the shaft box of the rotor by means of a pair of lateral rods and a triangular member itself articulated on the other hand on the support, and finally via a swivel joint to a short control rod for the collective pitch.

Likewise an analogous apparatus is known in which the articulation mechanism is a swivel joint on which the non-turning plate is mounted in oscillating fashion and which is itself mounted slidingly axially around a guide plate coaxially surrounding the shaft of the rotor and fixed to a casing integral with the structure of the rotorcraft, the upper link member being a caliper the upper end of which is integral with the shaft, the lower link member being likewise a caliper of which the lower end is integral with the casing and the control elements being servo controls.

These two approaches have the common disadvantage that, with the object of ensuring a radial positioning appropriate for the plates, it is necessary to mount the constituent parts with very little play. These mechanisms necessitate good lubrication of pieces which rub on one another. However despite this precaution, wear can appear after a certain service period which increases the play and can prevent the good functioning of the control elements. In particular, in the second embodiment noted above, the precise adjustment between the cooperating bearing surfaces of the swivel joint and of the non-turning plate as well as between the swivel joint and the guide plate is the origin of substantial friction which generates wear in the sliding mounting of the swivel joint and between this latter and the plate which it carries in such fashion that the risks of play appearing as the origin of vibrations, or the risks of jamming of the controls are increased. It is therefore necessary to carry out frequent maintenance.

In addition it should be noted that the first known embodiment which has been set out above is relatively complex and requires a large number of components.

With the object of avoiding these disadvantages it has been proposed in French Pat. No. 2119828 that the turning plate should be an inner plate carried by the shaft of the rotor via a joint comprising an interior ring having the general form of a spherical equatorial zone which is integral with the shaft and an external ring of a generally internal cylindrical form which is fixed to the inner plate, these rings being distanced one from another and having a certain number of axial grooves regularly spread about them and facing one another which surround, in each pair of facing grooves, a ball, a cage located in the space between the rings keeping the assembly of the balls in position while the non-turning plate is an external plate having essentially the form of a cylindrical annulus carried via two ball bearings by a cylindrical turned down skirt of the interior plate and this latter is reinforced by a tubular torus extending radially towards the exterior and supporting the joints of the pitch rods.

However this known embodiment has two disadvantages in common with the two other embodiments of the state of the art since, in all three cases, the pieces of the articulation mechanism for the plate which is interior relative to the shaft are subjected to dynamic stresses when working and are highly stressed, and as a result of the annular structure of a substantial number of components, it is necessary in order to change even just one of these pieces to dismount the rotor hub and sometimes to dismount the shaft which, with certain mountings of the latter, likewise entrains the dismantling of the output drives of the main transmission box which ensures the setting in rotation of the rotor shaft. This has the result of increasing by a very considerable amount the length of time and the cost of maintenance work.

OBJECTS OF THE INVENTION

It is a principal object of the present invention to avoid the disadvantages above mentioned and a specific object of the invention is to effect that the pieces of the mechanism articulating the plates relative to the shaft should be less loaded with the object of increasing their service life and diminishing the frequency of maintenance intervals. A further object of the invention is to obtain a structure in which substantially all of the components of the control apparatus for collective pitch and cyclic pitch of the blades which are susceptible to wear can be changed individually without dismounting the whole rotor.

Yet a further object of the invention is to reduce the risks of jamming of the controls. Finally a final object of the invention is to avoid any need for lubrication with oil or grease for this element.

GENERAL DESCRIPTION OF THE INVENTION

With these objects in view, the control apparatus for the collective pitch and for the cyclic pitch of the blades of a rotor of a rotorcraft of the above mentioned type is characterized by the fact that the articulation mechanism comprises at least three deformable laminated assemblies which are distributed, preferably regularly, around the shaft and each of which is constituted by an alternating stack of cup-shaped pieces of rigid material and layers of elastic material which permit, by means of deformation of the elastic material, inclination of the plates relative to the shaft with the object of controlling the cyclic pitch. In such an embodiment it is clear that these laminated deformable assemblies are little loaded since when functioning they work statically.

Furthermore this articulation mechanism based on deformable laminated assemblies avoids any risk of jamming of the control as far as of oscillations of the plates relative to the shaft of the rotor are concerned.

According to a preferred way of putting the invention into effect the deformable laminated assemblies are affixed to a common ring mounted slidingly along a fixed guide base which is integral with at least one casing rigidly connected to the structure of the rotorcraft and in the form of a cylinder of circular section mounted coaxially around a part of the shaft of the rotor, with the object of enabling the control of the collective pitch by translation of the assembly along the guide base and, in this case, the guide base advantageously comprises tow semi-cylindrical shells designed to be assembled one on to the other around the shaft of the rotor with the object of permitting mounting and dismounting of the guide base without dismounting the rotor itself.

The same advantage is obtained for the laminated deformable assemblies if these latter, according to characteristics particular to the invention, each comprise an internal armature substancially arched in the arc of a circle, the internal armature being assembled one relative to the other with the object of together constituting the common ring mounted slidingly on the guide base and if furthermore each deformable laminated assembly comprises likewise an external mounting assembled to the internal ring of the one or more roller bearings connecting the two plates together. Each deformable laminated assembly can thus be changed individually without demounting the whole rotor.

Furthermore each deformable laminated assembly is advantageously a laminated segment in the form of a portion of a sphere, the dishes of rigid material and the layers of elastic material being portions of a spherical cap, since such laminated segments provide furthermore a radial positioning sufficiently precise for the plates while still providing on the one hand substantial flexibility vis-à-vis the angular rotation of the plates by shear of the layers of elastic material and on the other hand substantial stiffness relative to radial forces taken up via the plates by compression of the layers of elastic material, the number of these layers being easily adjusted with the object of obtaining a satisfactory compromise between this flexibility and this rigidity. As each bearing for connecting the two plates has to be mounted round the shaft, it has a relatively great diameter and in accordance with the invention the external ring of the or each bearing is stiffened and constitutes the rotating plate. This arrangement of the external ring which permits it to be used as the turning plate produces a better channelling of the pitch control forces between the control elements which are servo controls and the pitch rods compared to the arrangements of the state of the art.

In this arrangement the non-turning plate which is a plate radially inwardly with respect to the roller bearing(s) advantageously extends radially towards the exterior and axially towards the fixture housing of the one or more lower linking elements via a skirt carrying the pivot mountings for the control elements and for the one or more lower link elements with the object of facilitating the joining of this plate on the one hand to the servo commands, on the other hand to at least one fixed caliper.

Finally, the pivot mountings of the pitch rods and of the one or more upper linking elements are separately and removably mounted on the rotating plate with the object of simplifying their mounting and to permit their dismounting if desired without demounting the whole rotor.

DESCRIPTION OF THE DRAWINGS

The invention will be better understood with the aid of one particular embodiment which is described in what follows as a non limitative example and with reference to the accompanying drawings in which:

Referring to FIGS. 1 to 3 the rotor mast comprises a tubular shaft 1 having in this example a central frustoconical portion and which is driven into rotation around its axis via its lower portion (not shown) which is connected to the main gear box of the helicopter. The rigid linkage of the shaft 1 of the rotor to the main gear box is ensured in the interior of a housing 2 which is integral with the structure of the helicopter, and the shaft 1 is anchored in the housing 2 for example via two conical roller bearings (not shown) which in flight support the load on the rotor and on the ground the weight of this latter. The rotor (likewise not shown) is, in well known fashion, fixed to the upper end of the shaft 1 by means of a hub to which several blades are connected each via its root and which is provided with a control lever for incidence or pitch of the corresponding blade. Around the shaft 1 there is mounted a guide box 3 formed by two substantially symmetrical shells which are assembled one relative to the other by bolting together in a vertical plane and axially relative to shaft 1. Each shell has a semi-cylindrical main section extended at one end by a portion which is half a frustocone. In this way, when the two shells are assembled one relative to the other around the shaft 1 the guide box 3 comprises an upper portion 4 having externally the shape of a short cylinder of circular section attached by its base which has a radial external shoulder 5, to a lower frustoconical section 6 which diverges towards the housing 2. The large base of the frustoconical section 6 has a radially external flange 7 by which the guide box 3 is rendered fixed and positioned on the housing 2 by means of at least one ring of studs carried by housing 2 and projecting upwardly, and each of which engages in an aperture pierced in flange 7, a nut such as 8 on FIGS. 1 and 2 being screwed onto each stud with the object of rigidly fixing the guide base 3 to the housing 2. During assembly of the two shells, centering is ensured by pins such as 9 which are located in apertures provided in the thickened upper ends and lower ends 10 and 11 of the upper section 4 and a shoulder ring 12 is engaged on the upper internal edges of the upper end 10 and bolted onto this latter by a ring of bolts such as 13 with the object of ensuring good positioning of the upper part of the guide base 3 with respect to the shaft 1. The housing 2 and the guide base 3 are manufactured for example of light alloy.

Figure 1:
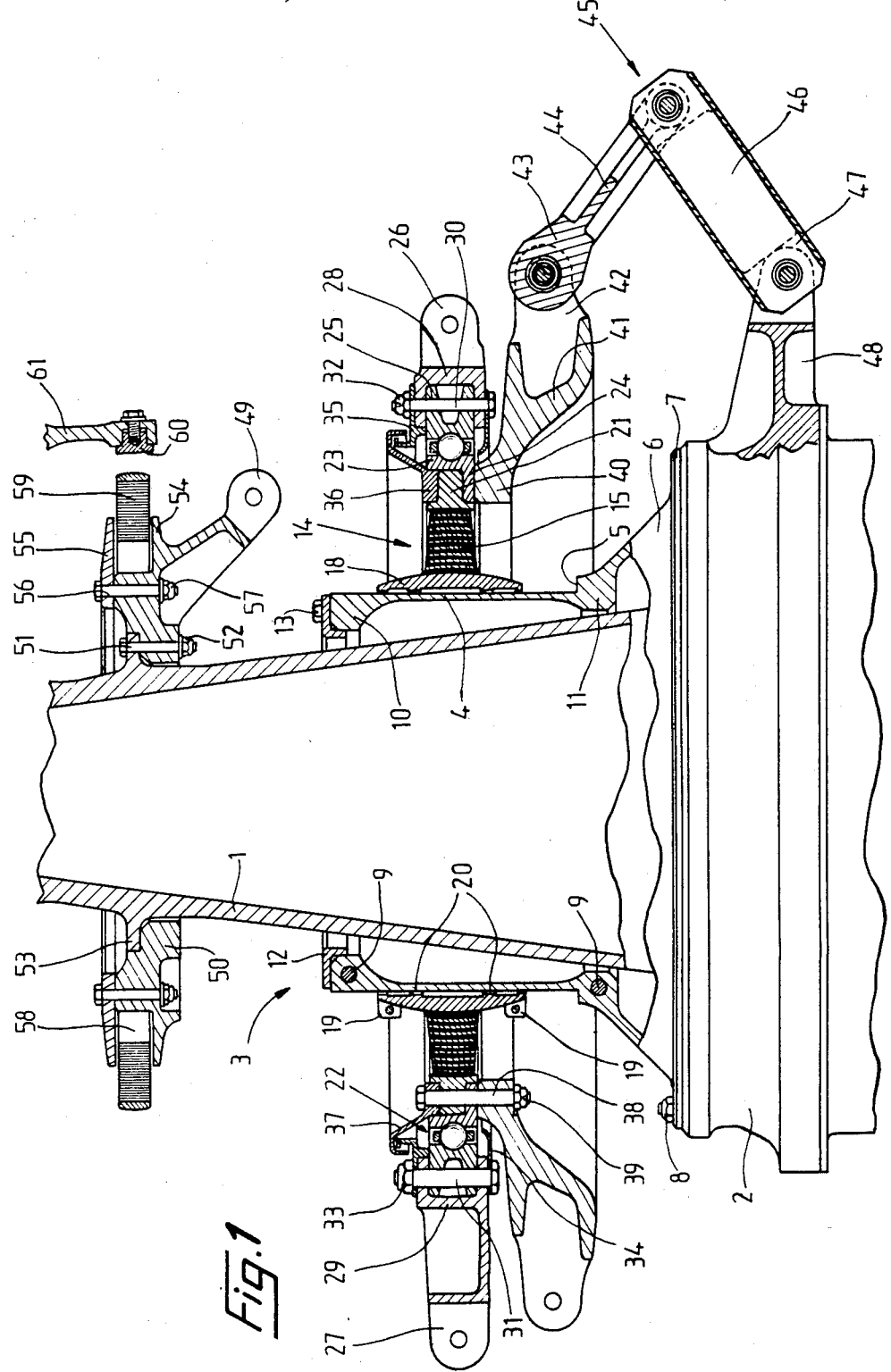
FIGS. 1 and 2 represent views substantially in section through a diametral plane and partly in lateral elevation, partly broken away, of an actual helicopter rotor which is provided with the pitch control apparatus in accordance with the invention and in respectively positions of null and non null cyclic pitch

Around the upper section 4 of the guide base 3 there are mounted three deformable laminated assemblies 14 which are identical and which are non adjacent one to another and are regularly spaced around the guide base 3. Each deformable laminated assembly 14 comprises a laminated block 15 constituted by a pile of alternating shell-like or cup-shaped members 16 of a rigid material, for example steel, and layers 17 of an elastic material, for example an elastomer or a rubber. The dishes 16 and layers 17 each have the shape of a portion of a spherical cap, the height of these portions (or the dimension of these portions along the axis of shaft 1) and the width of these portions (or the circumferential dimension of these portions) progressively increasing from the layer 17 at the external radial extremity of the block 15 to the layer 17 at its radially internal end and the dishes 16 and layers 17 are adhered or vulcanised alternately one to another in symmetrical fashion with respect to a radial median plane of each deformable laminated assembly 14. The number of layers 17 and dishes 16 as well as the rules for varying their height and/or their width and likewise their thickness from one layer or dish to the other, as well as over the same layer or dish, can be chosen with the object of giving to the block 15 the desirable elastic deformation characteristics in shear and/or compression. The radius or radii of curvature of the portions of spherical cap is or are located to the side of the axis of the shaft 1 and in the example shown the dishes 16 and layers 17 have a common centre of curvature located on the axis of shaft 1.

Via its radially internal concave surface the layer 17 of the radially inward end of the block 15 is fixed to the external radial face of corresponding convex curvature of a rigid internal armature 18, for example of steel. This inner armature 18 which is a portion in an arc of a circle subtending an angle at the centre of 120° of a circular ring, has an external surface that of a section of a sphere and an internal cylindrical surface. On each of its two ends, the armature 18 carries two radially external tabs 19 through which the three armatures 18 are assembled end to end by bolting together with the object of forming an inner ring mounted slidingly around the section 4 of the guide base 3 with the interposition of two self-lubricating segments 20 between the internal cylindrical surface of the inner ring and the external cylindrical surface of section 4 with the object of easing translation of the deformable laminated assemblies 14 along the guide base 3.

Each deformable laminated assembly 14 likewise comprises an external rigid armature 21, for example of steel, which is an arcuate portion in an arc of a circle subtended by an angle at the centre of 120° of a torus of transverse "T" section. The block 15 is integral with the radially external surface of its layer 17 of its outer radial extremity against the radially internal surface of this external armature 21. Via its radially external portion each of the three external armatures 21 rests against a lower internal radial flange 24 of the internal ring 23 of a large diameter ball bearing 22. The external ring 25 of this bearing 22 is of large dimension and stiffened and it has a "U"-shape in section open towards the exterior. Mounted on this external ring 25 are small radial yokes 26 and large radial yokes 27 projecting towards the exterior which are distributed alternately around the periphery of the ring 25 and each of which overlaps this latter by an inner bifurcated portion 28 or 29 via which the corresponding mounting 26 or 27 is bolted onto the external ring 25 by means of bolts 30 or 31 and nuts 32 or 33 which are locked or pegged. The bolts 30 or 31 go through aligned apertures provided not only in the external ring 25 and in the forks 28 or 29 respectively but likewise in a lubrication retaining plate 34 which also serves to protect the bearing 22 in the form of a ring with an internal rim slightly turned upwardly and held by the heads of the bolts 30 and 31 against the lower face of the external ring 25 of the bearing 22.

At the upper part of the bearing 22 there is installed a device for retaining lubrication and for protecting the bearing against the incursion of water which is formed on the one hand by a first ring 35 of which a radially external tab is held via nuts 32 and 33 against the upper face of the external ring 25 while its central part which projects downwards ensures its centering on the external ring 25 and that its radially internal portion projects upwardly and is slightly turned back towards the exterior at its upper end and on the other hand by a second ring member 36 applied on the radially external portion of the external armatures 21 of the deformable laminated assemblies 14 and constituted by a skirt 37 which projects upwardly and radially towards the exterior and is turned down at its external end towards the base in order that it may come to cover the radially inner part of the first ring in such a way as to form a labyrinth protection joint for bearing 22.

This second crown 36 and the radially outer portion of the external armatures 21 of the laminated deformable assemblies 14 are fixed on the lower inner collar of the internal ring 23 of the bearing 22 via a ring of bolts 38 and nuts 39 locked and pinned by means of which a ring 40 is simultaneously fixed against the lower face of the internal ring 23 of the bearing 22. This ring 40 is radially extended towards the exterior and downwards by means of a skirt 41 which carries two radially outwardly projecting wings which extend towards the outside one of which is above the other, these wings being formed into four yokes 42 distributed at 90° around the periphery of the skirt 41.

On one of these yokes 42 with cheeks parallel to the axis fo the shaft 1, there is jointed by means of self-lubricating bearings a swivel joint fixture 43 on the free end of the upper leg 44 of a caliper 45 the lower leg 46 of which is articulated via a self-lubricating double cylindrical bearing 47 on a double lateral yoke 48 on the side of the housing 2 while the three other mountings 42 are each joined, likewise via self-lubricating bearings, on the swivelling end of the upper end of a servo command cylinder (not shown) the swivel coupling of the lower end of which is articulated onto an element of the structure of the helicopter. In analogous fashion each of the small yokes 26 carried by the external ring 25 of the bearing 22 is connected via self-lubricating bearings onto the swivel joint mounting at the free end of the lower branch of a caliper (not shown) similar to caliper 45 and the upper branch of which is articulated via a double cylindrical bearing of self-lubricating type onto one of the downwards projecting radial mountings 49 of a caliper entrainer 50 fixed by bolts such as 51 and nuts such as 52 onto a radially external collar 53 of shaft 1. Each of the large yokes 27 carried on the external ring 25 of the bearing 22 is connected via a swivel joint to the fitting on the lower end of a pitch control rod (not shown) of adjustable length and of which the swivel mounting on the upper end is joined to the control lever for the pitch or incidence of one of the blades of the rotor.

There is thus formed a control apparatus for the pitch of the blades of the rotor in which the ring 40 and its skirt 41 constitute the non-turning plate, fixed for rotation relative to the shaft 1 by means of the fixed caliper 45, which connects it to the fixed housing 2, and which is likewise connected via the mountings 42 to servo controls. This non-turning plate 40 and 41 is attached to external armatures 21 of three deformable laminated assemblies 14 which are mounted slidingly via their internal armatures 18 along the guide base 3, and to the internal ring 23 of bearing 22, the external ring 25 of which constitutes the turning plate set into rotation with the shaft 1 by the rotating calipers connecting the mountings 26 to mountings 49 of the caliper entrainer 50, and this rotating plate 25 is likewise connected to the control levers for the pitch of the blades via pitch rods connected to the mountings 27.

Figure 2:
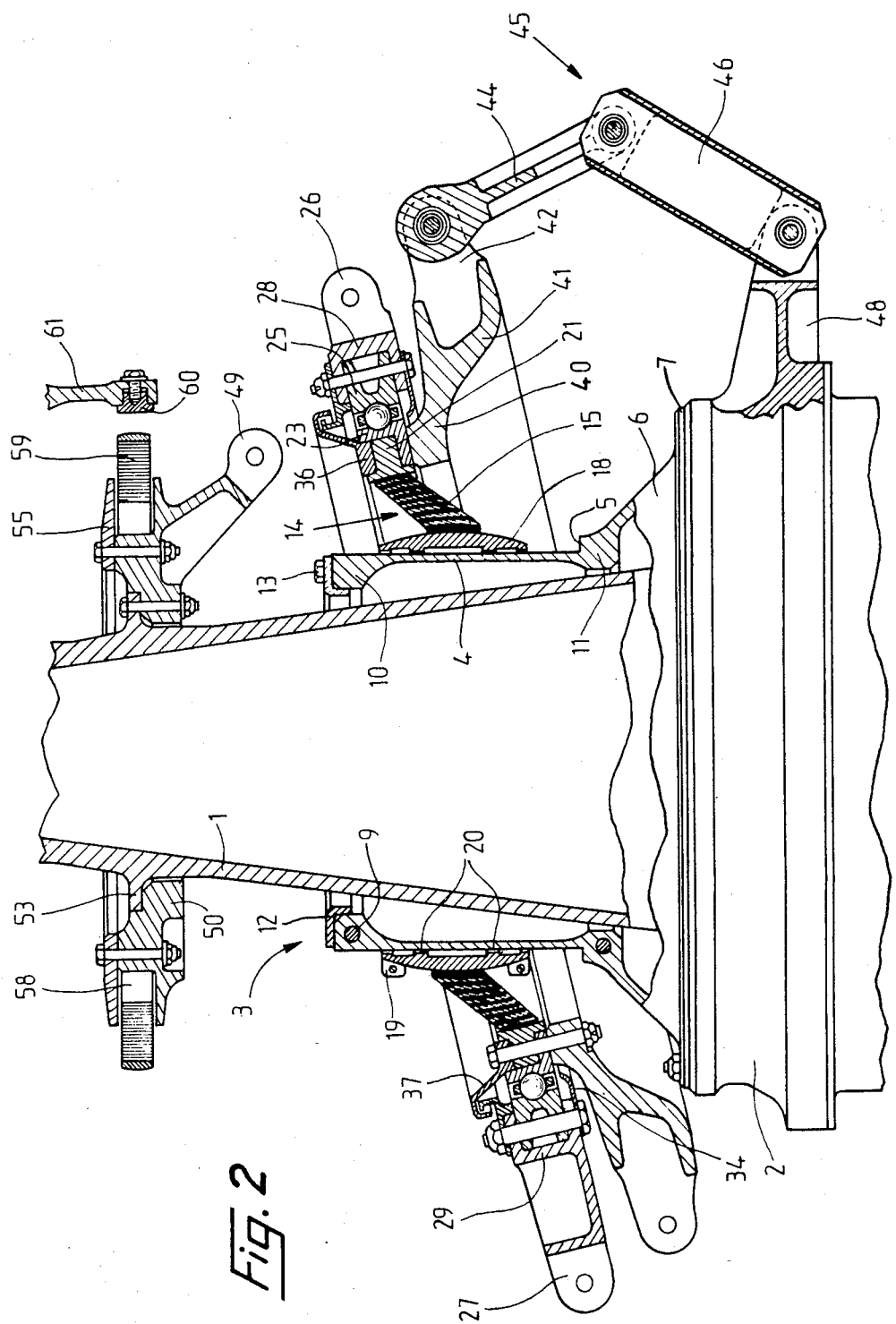
Figure 3:
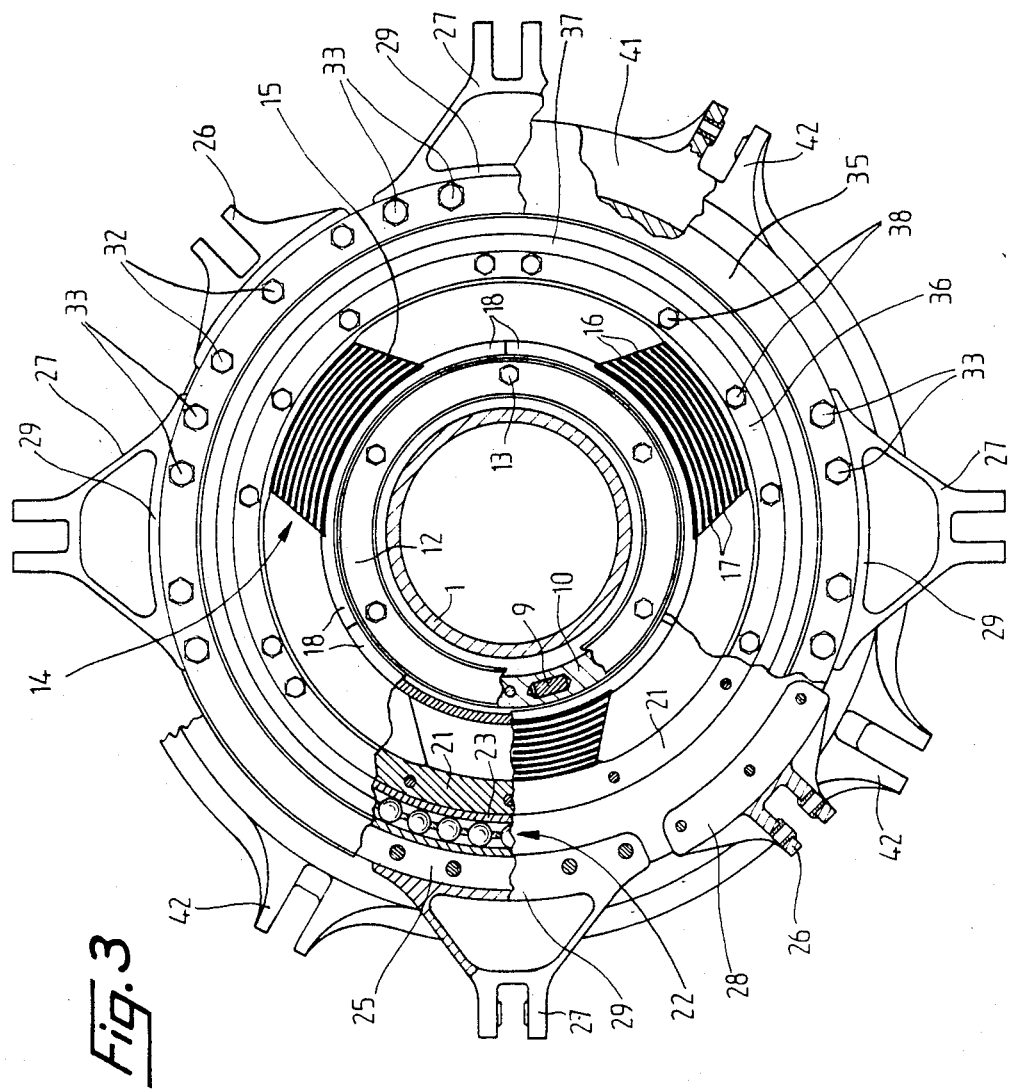
FIG. 3 is a view partly in plan and partly in transverse section with cut-away portions of the device shown in FIG. 1.

Thus a simultaneous and equal action exerted in the same sense by the servo controls on the non-turning plate 40-41 translates the assembly constituted by the two plates 40-41 and 25 the bearing 22 and the deformable laminated assemblies 14 in translation along the guide base 3. This sliding movement is transmitted by pulling or pushing on pitch rods simultaneously to all the levers for pitch control in such a fashion that the collective pitch of the blades may be controlled. On the other hand differential action of the servo controls provokes, by means of shearing deformation of the elastic layers 17 of the laminated blocks 15 the inclination of the assembly of the two plates 40-41 and 25 and of the bearing 22 with the external armatures 21 of the deformable laminated assemblies 14, as is shown on FIG. 2, while the internal armatures 18 do not move, which corresponds to transmission of a cyclic pitch control through the pitch rods to control levers for the pitch of the blades.

In this example one can advantageously use a lower radially external collet 54 of the entrainer 50 of the rotating caliper in order to limit, with a ring 55 fixed on this entrainer 50 by means of bolts 56 and nuts 57 a throat 58 for the location of a reciprocal ring 59 which cooperates with lower abutments such as 60 of which each is for example projecting under the pitch control lever 61 of the corresponding blade with the object of limiting the downward inclination of the blade at stall and at low rotor rotation speeds.

It is to be understood that with such an apparatus it should be possible to proceed to the individual replacement of all of the component parts which are susceptible to wear, with the exception of the bearing 22 without having to dismount the actual rotor itself, which is a very substantial and important advantage. The use of the external ring of the bearing as the rotating plate permits an economic and easy realisation of this element between the servo controls and the pitch rods. Finally the laminated blocks 15 ensure good radial positioning of the plates around the shaft.

We claim:

1. Apparatus for controlling the collective pitch and cyclic pitch of blades of a rotor of a rotorcraft, the rotor craft having a main body and a housing rigidly connected to the main body, the rotor comprising a shaft extending out of the housing rotatably driven about a rotor rotation axis and rotor blades connected to the shaft, each rotor blade having a pitch, a control lever for controlling the pitch, and a respective pitch control rod connected to the control lever, said apparatus comprising:
two annular plates coaxially mounted around said shaft, one of said plates being a turning plate and the other being a non-turning plate;
ball bearing means interconnecting said plates;
at least one lower linking member preventing rotation of said non-turning plate about said rotation axis connected to the housing and to the non-turning plate, said non-turning plate including articulating means for mounting said apparatus to be displacable in translation in the direction of said rotation axis and tiltable with respect to said rotation axis;
at least one upper linking member driving said turning plate in rotation with the shaft linked to the shaft and to said turning plate, the pitch control rod of each of the rotor blades being connected to said turning plate;

combined function collective pitch and cyclic pitch control member connected to said non-turning plate for displacing it along said shaft and for tilting it with respect to said rotation axis, said turning plate following the movement of said non-turning plate and transmitting these movements to the pitch control levers via the pitch control rods;

said articulating means including at least three deformable laminated assemblies spaced apart from one another and distributed about the shaft, each assembly comprising a stack of alternating dish-shaped elements of rigid material and layers of an elastic material allowing, by shear deformation of said elastic material, said plates to be tilted with respect to said rotation axis for controlling cyclic pitch, and a radially inner rigid armature and a radially outer rigid armature between which said stack is sandwiched, said inner armature being armated substantially in the form of an arc of a circle, the inner armatures of all said assemblies being assembled together forming a unitary radially inner ring slidingly mounted in the direction of said rotation axis, the outer armature of all said assemblies forming a crown supporting said ball bearing means.

2. Apparatus as claimed in claim 1, further comprising a fixed guide base of cylindrical form mounted coaxially around a part of the shaft and integral with the housing, said inner ring being mounted axially slidingly along said guide base.

3. Apparatus as claimed in claim 2, wherein said guide base comprises two semi-cylindrical shells assembled together about the shaft.

4. Apparatus as claimed in claim 1, wherein said ball bearing means includes a radially internal ring and said crown is attached to said radially internal ring of said ball bearing means.

5. Apparatus as claimed in claim 1, wherein said ball bearing means includes a radially external ring which constitutes said turning plate.

6. Apparatus as claimed in claim 1, wherein said non-turning plate is a radially inner plate with respect to said ball bearing means, and has a skirt extending radially outwards and axially towards said housing, said skirt carrying yokes for pivotally connecting said combined function collective pitch and cyclic pitch control members and each said lower linking member to said non-turning plate.

7. Apparatus as claimed in claim 1, wherein said turning plate carries a plurality of yokes which are separately and removably attached at a plurality of spaced locations about the periphery of said turning plate for pivotally connecting said turning plate to the pitch control rods and to each said upper linking member.

* * * * *